(12) United States Patent
Carson (10) Patent No.: US 7,324,582 B2
(45) Date of Patent: Jan. 29, 2008

(54) SYSTEM AND METHOD FOR THE DIRECTIONAL RECEPTION AND DESPREADING OF DIRECT-SEQUENCE SPREAD-SPECTRUM SIGNALS

(75) Inventor: Lansing McLain Carson, Chandler, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 772 days.

(21) Appl. No.: 10/754,001

(22) Filed: Jan. 7, 2004

(65) Prior Publication Data

US 2005/0147155 A1    Jul. 7, 2005

(51) Int. Cl.
*H04B 1/69* (2006.01)
(52) U.S. Cl. ............... 375/147; 342/343; 342/368; 370/339; 375/133; 375/135; 375/136; 375/140
(58) Field of Classification Search ............ 340/162; 375/130, 350; 370/335; 455/273; 600/447; 702/152; 711/114
See application file for complete search history.

(56) References Cited

U.S. PATENT DOCUMENTS

| | | | |
|---|---|---|---|
| 4,885,715 A | 12/1989 | McCanny et al. | |
| 4,974,187 A | 11/1990 | Lawton | |
| 5,109,356 A | 4/1992 | Lawton | |
| 5,214,768 A * | 5/1993 | Martin et al. ............... | 711/114 |
| 5,375,146 A * | 12/1994 | Chalmers .................... | 375/350 |
| 5,477,859 A | 12/1995 | Engeler | |
| 5,510,796 A * | 4/1996 | Applebaum ................ | 342/162 |
| 5,629,929 A | 5/1997 | Blanchard et al. | |
| 5,831,977 A * | 11/1998 | Dent ........................... | 370/335 |
| 5,917,446 A | 6/1999 | Greenspan | |
| 6,154,443 A | 11/2000 | Huang et al. | |
| 6,359,923 B1 * | 3/2002 | Agee et al. ................. | 375/130 |
| 6,598,009 B2 * | 7/2003 | Yang .......................... | 702/152 |
| 6,606,058 B1 | 8/2003 | Bonek et al. | |

OTHER PUBLICATIONS

Brown, "Performance and Jamming Test Results of a Digital Beamforming GPS Receiver," Joint Services Data Exchange, May 2002.

* cited by examiner

*Primary Examiner*—David C. Payne
*Assistant Examiner*—Adolf DSouza
(74) *Attorney, Agent, or Firm*—Steptoe & Johnson (57) ABSTRACT

A system (100) and method for the reception and despreading of a code-division multiple access (CDMA) global positioning system (GPS) signal (200), or other direct-sequence spread-spectrum (DSSS) signals, is provided. An antenna array (102) receives the DSSS signal (200) over a plurality of elements (116). A preprocessor (104) down converts and digitizes the DSSS signal (200) to produce a signal stream (202) in the time domain. An FFT (106) transforms the signal stream (202) to the frequency domain. A beam former (108) generates a reception beam (201) for the DSSS signal (200) in the frequency domain, and also implements a narrowband frequency notch, if desired. A despreader (110) despreads the transformed signal stream (204) in the frequency domain. An IFFT (112) transforms the despread signal stream (208) back to the time domain. And a postprocessor (114) converts the transformed despread signal stream (210) into a desired received signal stream (212) in the time domain.

28 Claims, 3 Drawing Sheets

SYSTEM AND METHOD FOR THE DIRECTIONAL RECEPTION AND DESPREADING OF DIRECT-SEQUENCE SPREAD-SPECTRUM SIGNALS

TECHNICAL FIELD OF THE INVENTION

The present invention relates to the field of spread-spectrum receivers. More specifically, the present invention relates to the field of direct-sequence spread-spectrum receivers and despreaders.

BACKGROUND OF THE INVENTION

Direct-sequence spread-spectrum (DSSS) radio signals are used in many applications. One such application is the Global Positioning System (GPS), which provides timing and positioning data for use worldwide. The GPS uses code-division multiple-access (CDMA) signals (i.e., DSSS signals) which are broadcast from a constellation of twenty-four MEO (medium Earth orbit) satellites at approximately 20,100 km altitude. By being so located, these satellites may provide GPS signals to low Earth orbit (LEO) and terrestrial receivers.

The encoding used in such CDMA signals may be any of several types. For example, standardized C-code, P/Y code and future M-code systems are of interest.

The receivers for conventional military GPS signals desirably use beam forming to minimize interference and/or jamming. Commercial applications of beam forming reduce undesirable multipath effects. Beam forming is conventionally performed through the use of analog circuitry in the time domain. This analog circuitry requires the use of precision components and careful thermal tracking. This results in a significant manufacturing cost in both monies and time as well as a cumbersome circuit card mass.

The despreading of DSSS signals conventionally requires complex correlation. With M-code GPS receivers, despread synchronization often requires a significant time. Desirably, such receivers use multiple parallel despreaders for rapid synchronization of the M-code. This results in a significant increase in circuit complexity.

Analog beam formers and multiple parallel correlators result in a circuit that is large, complex, and potentially fragile. This results in a significant increase in costs for a number of reasons: circuit "real estate" (i.e., size), circuit power consumption, and circuit reliability.

In addition, CDMA GPS and other DSSS signals are susceptible to jamming and other narrowband interference. This interference may render the desired signal totally unusable to the receiver.

SUMMARY OF THE INVENTION

Accordingly, it is an advantage of the present invention that a system and method for the reception and despreading of direct-sequence spread-spectrum (DSSS) signals are provided.

It is another advantage of the present invention that a system and method of simplified beam formation and despreading are effected without a need for a plurality of parallel beam formers and/or despreaders.

It is another advantage of the present invention that a system and method of simplified beam formation are provided that effect beam formation in the frequency domain.

It is another advantage of the present invention that the simplified method of beam formation provides the ability to reduce narrowband interference or jamming by filtering the beam formed.

It is another advantage of the present invention that a system and method of simplified despreading of the DSSS signal are provided that effect despreading in the frequency domain.

The above and other advantages of the present invention are carried out in one form by a system for the reception and despreading of a DSSS signal, where the system includes an antenna array having a plurality of elements to receive the signal, a preprocessor to preprocess the signal in the time domain, a first transformer to transform the DSSS signal into the frequency domain, a beam former to form a reception beam in the signal in the frequency domain, a despreader to despread the signal in the frequency domain, and a second transformer to transform the despread signal back into the time domain.

The above and other advantages of the present invention are carried out in another form by a method of receiving a direct-sequence spread-spectrum signal, where the method includes receiving the signal at each of a plurality of antenna elements in an antenna array, preprocessing the signal in the time domain, transforming the signal into the frequency domain, forming a reception beam for the signal in the frequency domain, despreading the signal in the frequency domain, and transforming the signal back to the time domain.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

To minimize confusion, physical components are assigned reference numbers in the 100s, while signals, reception beams, signal streams and segments thereof, clocks, data codes, and the like are assigned reference numbers in the 200s.

Figure 1:
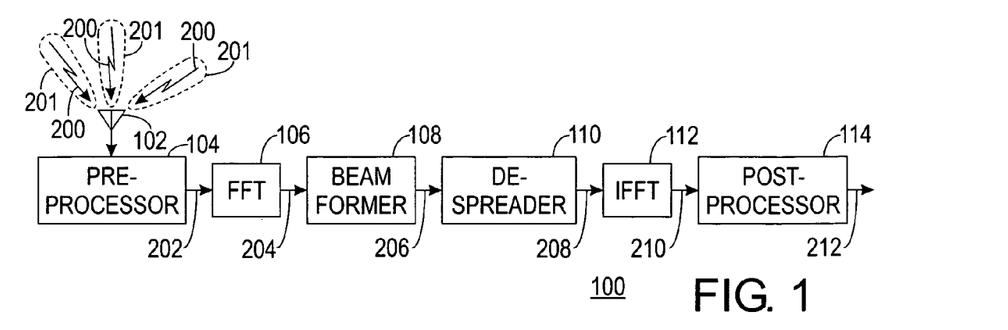
FIG. 1 shows a schematic block diagram depicting overall operation of a system for the reception and despreading of a direct-sequence spread-spectrum (DSSS) signal in accordance with a preferred embodiment of the present invention.

FIG. 1 shows a schematic block diagram depicting the overall operation of a system 100 for the reception and despreading of a wideband direct-sequence spread-spectrum (DSSS) signal 200 in accordance with a preferred embodiment of the present invention. System 100 is configured to receive, form reception beams 201 in, and despread DSSS signal 200. In the context of this discussion, reception beam 201 is a received-signal analog of a transmission beam were system 100 a transmission system. In other words, reception beam 201 provides reception directionality for antenna array 102 in the reception of DSSS signal 200.

In the preferred embodiment, DSSS signal is a code-division multiple-access (CDMA) signal, specifically a global positioning system (GPS) signal. Those skilled in the art will appreciate, however, that system 100 may readily be adapted to DSSS signals other than a CDMA GPS signal, including, but not limited to, conventional CDMA cellular radio telephony and other forms of communication, without departing from the spirit of the present invention.

DSSS signal 200 is received by an antenna array 102 and passed to a preprocessor 104. Preprocessor 104 preprocesses (i.e., processes prior to beam forming and despreading) DSSS signal 200 into a time-domain (TD) DSSS signal stream 202. The operation of preprocessor 104 is discussed in more detail hereinafter in conjunction with FIG. 2.

TD DSSS signal stream 202 then passes to a transformer 106. In transformer 106, TD DSSS signal stream 202 is transformed from the time domain to the frequency domain to produce a frequency-domain (FD) TDSS signal stream 204. Transformer 106 is a time-to-frequency domain (TFD) transformer 106. In the preferred embodiment, TFD transformer 106 performs a fast-Fourier transform (FFT). Those skilled in the art will appreciate that transforms other than an FFT may be used to transform TD DSSS signal stream 204 from the time domain to the frequency domain without departing from the spirit of the present invention. The operation of TFD transformer 106 is discussed in more detail hereinafter in conjunction with FIGS. 3 and 4.

FD DSSS signal stream 204 then passes to a beam former 108. Beam former 108 forms a plurality of beamed signal streams 206 in the frequency domain. The formation of beamed signal streams 206 effects the formation of reception beams 201 for the original DSSS signal 200. In the context of this discussion, reception beam 201 is a received-signal analog of a transmission beam were system 100 a transmission system. In other words, reception beam 201 provides reception directionality for antenna array 102 in the reception of DSSS signal 200. The operation of beam former 108 is discussed in more detail hereinafter in conjunction with FIGS. 3 and 4.

Beamed signal streams 206 are then passed to a despreader 110. Despreader 110 despreads beamed signal streams 206 into an FD despread signal stream 208 in the frequency domain. The operation of despreader 110 is discussed in more detail hereinafter in conjunction with FIGS. 3 and 4.

FD despread signal stream 208 then passes to a transformer 112. Transformer 112 transforms FD despread signal streams 208 from the frequency domain to the time domain to produce a TD despread signal stream 210. Transformer 112 is therefore a frequency-to-time domain (FTD) transformer 112. In the preferred embodiment, FTD transformer 112 is an inverse fast-Fourier transformer (IFFT). Those skilled in the art will appreciate that transformers other than an IFFT may be used to transform FD despread signal streams 208 from the frequency domain to the time domain without departing from the spirit of the present invention. The operation of FTD transformer 112 is discussed in more detail hereinafter in conjunction with FIGS. 3 and 4.

FD despread signal stream 210 then passes to a postprocessor 114. Postprocessor 114 postprocesses FD despread signal stream 210 to produce a received signal stream 212. Postprocessor 114 is discussed hereinafter in more detail in conjunction with FIG. 5.

Figure 2:
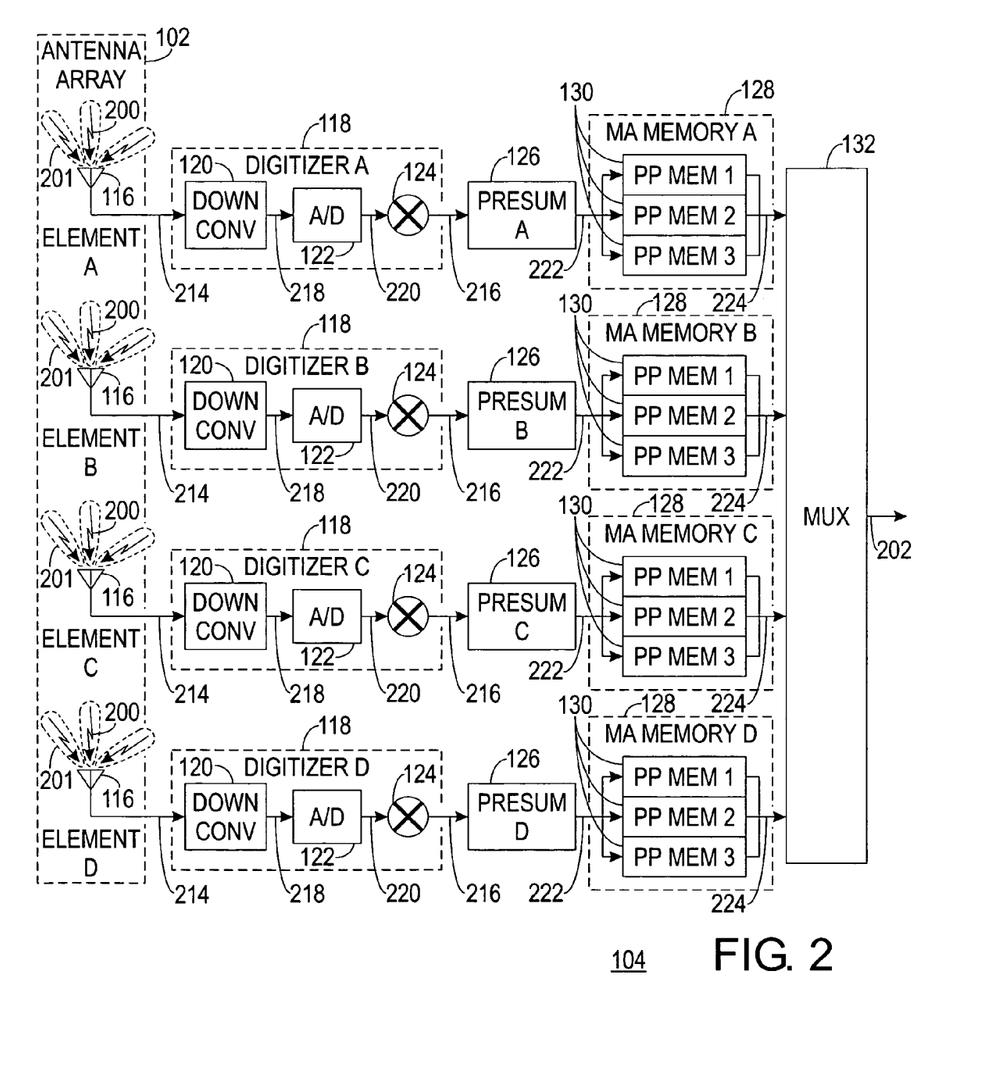
FIG. 2 shows a schematic block diagram depicting operation of a preprocessor for the system of FIG. 1 in accordance with a preferred embodiment of the present invention.

FIG. 2 shows a schematic block diagram depicting the operation of antenna array 102 and preprocessor 104 of system 100 in accordance with a preferred embodiment of the present invention. The following discussion refers to FIGS. 1 and 2.

DSSS signal 200 is received by antenna array 102. Antenna array 102 is made up of a plurality of antenna elements 116. At each antenna element 116, DSSS signal 200 is received as a DSSS elemental signal 214, i.e., as the signal received at that one antenna element 116.

Each DSSS elemental signal 214 then enters preprocessor 104, where it passes into one of a plurality of digitizers 118. There is a one-to-one relationship between antenna elements 116 and digitizers 118. Each digitizer 118 down converts, and digitizes DSSS elemental signal 214 to produce a DSSS baseband signal 216.

Within each digitizer 118, DSSS elemental signal 214 passes into an analog down converter 120, where DSSS elemental signal 214 is down converted using conventional techniques to produce a DSSS converted signal 218. DSSS converted signal 218 is, in effect, an intermediate-frequency signal. Those skilled in the art will appreciate that, in some applications, analog down converter 120 may be omitted without departing from the spirit of the present invention. If analog down converter 120 were to be omitted, DSSS converted signal 218 would be DSSS elemental signal 214.

DSSS converted signal 218 then passes into an analog-to-digital (A/D) converter 122. A/D converter 122 digitizes DSSS converted signal 218 to produce a DSSS digitized signal 220.

DSSS digitized signal then passes into a digital down converter 124. Digital down converter 124 down converts DSSS digitized signal 220 into a near baseband signal 216 having only unknown frequency error and Doppler shift. Since DSSS digitized signal 220 is a digital signal, digital down converter 124 may be realized as a simple multiplier, though this is not a requirement of the present invention.

With DSSS baseband signals 216, DSSS elemental signals 214 have been down converted and digitized. DSSS baseband signals 216 are the outputs of digitizers 118.

Those skilled in the art will appreciate that digitizers 118, and the components therein (i.e., analog down converters 120, A/D converters 122, and digital down converters 124) are exemplary of the preferred embodiment only. Other techniques and circuitry may be used to produce DSSS baseband signals 216 without departing from the spirit of the present invention.

DSSS signal 200 is received at each antenna element 116. However, due to the spacing between antenna elements 116, each DSSS elemental signal 214 has a potentially unique phase depending upon the direction from which a transmitted DSSS signal 200 originates. All digitizers 118 are substantially identical. The phase relationships between DSSS elemental signals 214 are therefore maintained in DSSS baseband signals 216. Each DSSS baseband signal 216 potentially differs from each other DSSS baseband signal 216 solely in phase.

From each digitizer 118, DSSS broadband signal 216 passes to a presummer 126. Presummer 126 adjusts DSSS baseband signal 216 preparatory to fracturing (discussed hereinafter). Taken together, the adjustments effected by presummers 126 result in each DSSS baseband signal 216 being segmented and displaced in time a predetermined amount while preserving the phase relationships between DSSS baseband signals 216. As is well known in the art, the degree of presumming performed by presummer 126 is relevant to the signal bandwidth. The output of each presummer 126 is DSSS adjusted signal 222.

Each DSSS adjusted signal 222 passes into a multi-access memory 128. Multi-access memory 128 fractures DSSS adjusted signal 222 into a plurality of DSSS signal-stream segments 224. Each DSSS signal-stream segment 224 is a portion of DSSS adjusted signal 222 (as segmented and displaced by presummer 126).

In this discussion, the term "multi-access memory" may be taken to mean any circuit that performs the function of a multi-access memory. In the preferred embodiment, each multi-access memory 128 is a cluster of three ping-pong random-access memories (PP RAM) 130 which cycle DSSS signal-stream segments 224 preparatory to multiplexing (discussed hereinafter). In other embodiments, multi-access memory 128 may be conventional random-access memory (RAM) where the multi-access aspect is performed though any of numerous well-known addressing schemes.

Alternatively, multi-access memory 128 may be implemented though the use of shift registers and other well-known techniques. Those skilled in the art will appreciate that the specific methodology used to implement multi-access memories 128 is not a requirement of the present invention. The use of a specific methodology does not depart from the spirit of the present invention.

In the preferred embodiment, each multi-access memory 128 stores each segment of DSSS adjusted signal 222 in a sequentially rotary manner. Starting at an arbitrary time, a first segment is stored in a first PP RAM 130, a second segment in a second PP RAM 130, a third segment in a third PP RAM 130, a fourth segment in the first PP RAM 130, and so on. Multi-access memories 128 associated with each antenna element 116 perform these storages in parallel. This results in temporally identical segments of each DSSS adjusted signal 222 being stored in the corresponding PP RAM 130 in each multi-access memory 128 (e.g., in the first PP RAM 130 of each multi-access memory).

DSSS signal-stream segments 224 from each multi-access memory 128 then pass into a multiplexer 132. Multiplexer 132 cyclically multiplexes temporally identical DSSS signal-stream segments 224 from each multi-access memory 128 to produce TD DSSS signal stream 202 in the time domain. Due to the synchronization and displacement provided DSSS adjusted signals 216 by presummers 126, TD DSSS signal stream 202 is made up of consecutive segments, e.g., (assuming four antenna elements 116 "A," "B," "C," and "D") a first "A" segment (derived from element "A"), a first "B" segment (derived from element "B"), a first "C" segment (derived from element "C"), a first "D" segment (derived from element "D"), a second "A" segment, a second "B" segment, a second "C" segment, a second "D" segment, a third "A" segment, a third "B" segment, etc. TD DSSS signal stream 202 is therefore a stream of serially interleaved DSSS signal-stream segments 224 forming a composite of signal-stream segments derived from all DSSS elemental signals 214. In the preferred embodiment, the data rate is "N" times the data rate of each DSSS adjusted signal 216, where "N" is equal to the number of antenna elements 116.

In the preferred embodiment, multiplexer 132 is a conventional physical multiplexer. Those skilled in the art will appreciate that, in many cases, multiplexing may be performed without the use of a conventional physical multiplexer. It will be appreciated, therefore, that in this context the term "multiplexer" may be taken to mean any circuit or arrangement of components that multiplexes, i.e., fulfills the function of a conventional physical multiplexer. The use of any scheme other than a conventional physical multiplexer does not depart from the spirit of the present invention.

Figure 3:
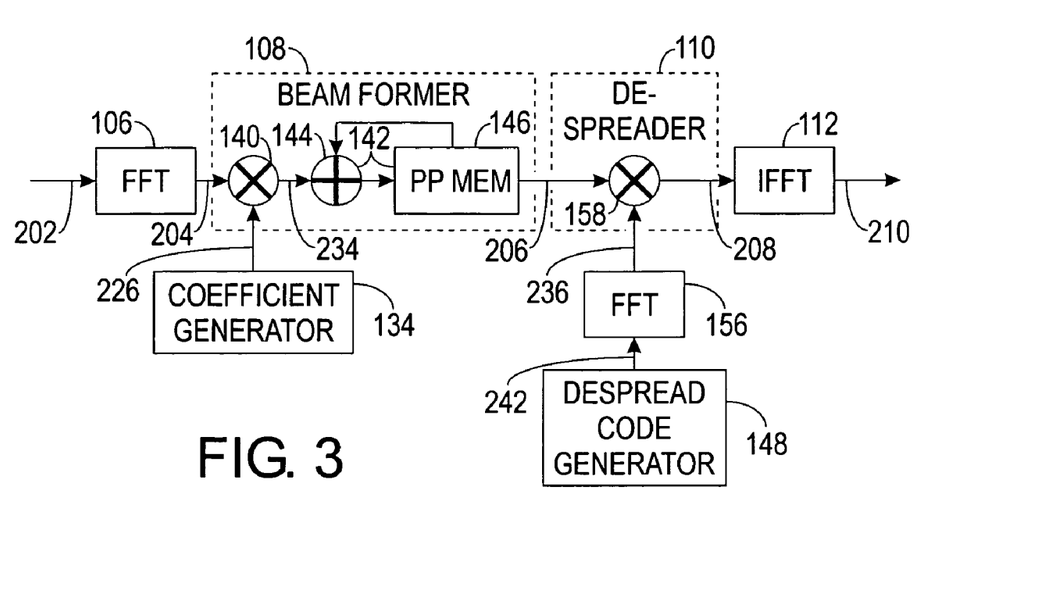
FIG. 3 shows a schematic block diagram depicting operation of a beam-former and despreader for the system of FIG. 1 in accordance with a preferred embodiment of the present invention.
Figure 4:
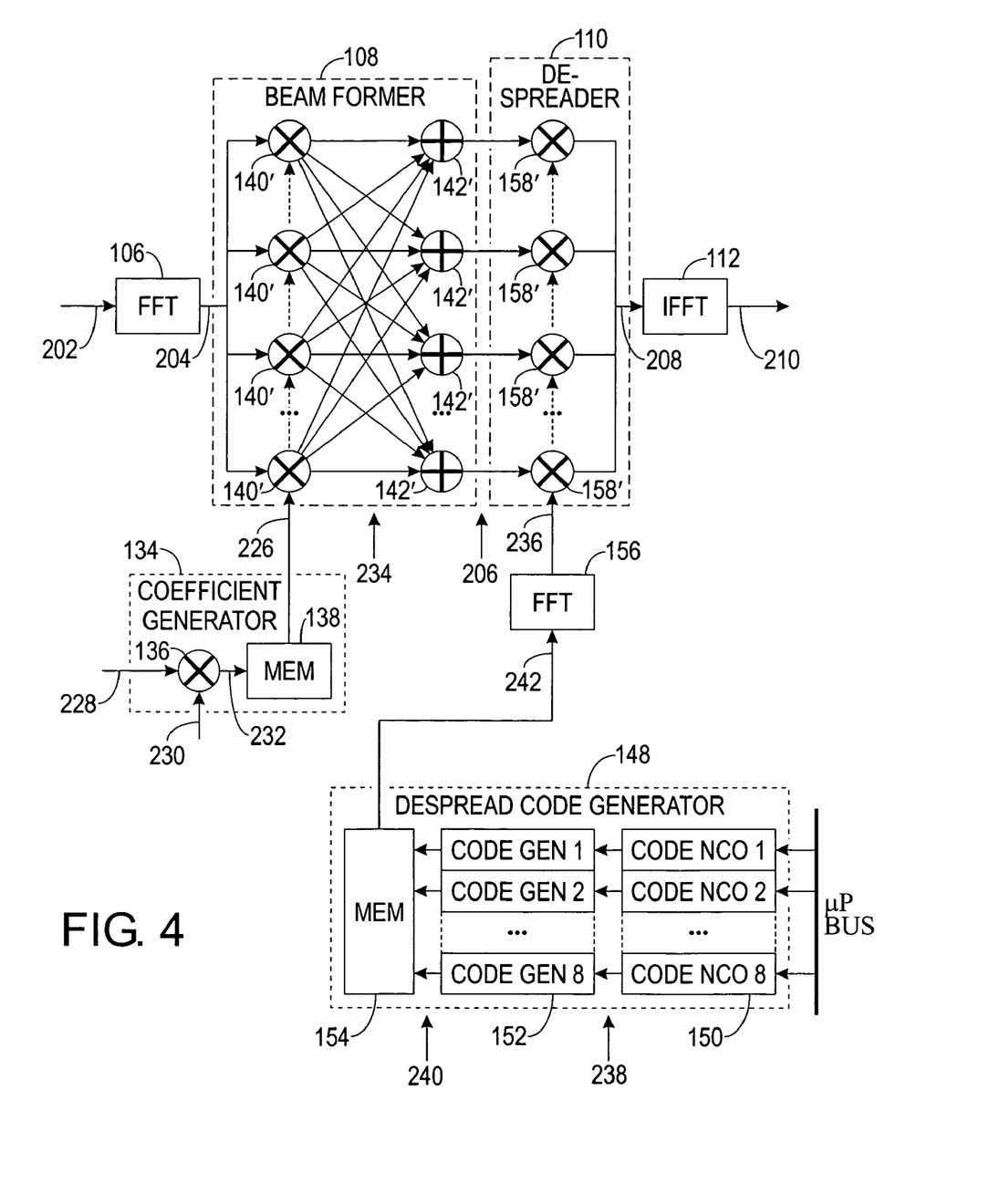
FIG. 4 shows a schematic block diagram depicting detailed operation of the beam former and despreader of FIG. 3 in accordance with a preferred embodiment of the present invention.

FIGS. 3 and 4 show a schematic block diagram depicting the operation of beam-former 108 and despreader 110 for system 100 in accordance with a preferred embodiment of the present invention. FIG. 3 demonstrates a physical perspective, and FIG. 4 demonstrates a "logical" or effective perspective of the operation. TFD and FTD transformers 106 and 112 have been included in FIGS. 3 and 4 for clarity. The following discussion refers to FIGS. 1, 2, 3, and 4.

TFD transformer 106 transforms TD DSSS signal stream 202 from the time domain to the frequency domain and produces FD DSSS signal stream 204. TD DSSS signal stream 202 contains a steady stream of DSSS signal-stream segments 224 in the time domain, i.e., serially in time. Each segment, under control of presummer 126, multi-access memory 128 and multiplexer 132 (FIG. 2), represents a "block" of information (not necessarily associated with a "block of data" as transmitted in DSSS signal 200) having a predetermined size. TDF transformer 106 is sized and synchronized in harmony with multi-access memory 128 and multiplexer 132 so that TDF transformer 106 serially transforms each segment in turn. Therefore, after the transformation of TD DSSS signal stream 202 to the frequency domain, FD DSSS signal stream 204 contains a stream of sequential signal-stream segments, where each segment has been transformed into a plurality of frequency "bins" (not shown) by TFD transformer 106. This sequential transformation eliminates the need for multiple TFD transformers 106, and allows beam former 108 and despreader 110 to sequentially process each segment in the frequency domain, with subsequent segments being processed sequentially over time (i.e., serially).

The following discussion refers to FIGS. 1, 3, and 4.

Beam former 108 forms beamed signal streams 206 from FD DSSS signal stream 204 in response to a coefficient stream 226. A coefficient generator 134 is used to generate coefficient stream 226.

Beam coefficients 228 defining the desired reception beam 201 for DSSS signal 200 are obtained. Depending upon the application, beam coefficients 228 may be determined from a search, extracted from a table, computed, or determined from DSSS signal 200. In the preferred embodiment, where DSSS signal 200 is a CDMA GPS signal, beam coefficients 228 are computed from data received in DSSS signal 200 revealing the location of the transmitter transmitting DSSS signal 200. Because of this, system 100 of the preferred embodiment forms reception beam 201 after initial reception of DSSS signal 200, then refines reception of DSSS signal 200 in response to reception beam 201.

Similarly, filter coefficients 230 for a narrowband notch filter are obtained. Depending upon the application, filter coefficients 230 may be extracted from a table, measured, or computed. In the preferred embodiment, filter coefficients 230 are computed for narrowband signals. Such narrowband signals are construed as interference or jamming (i.e., intentional interference). In the preferred embodiment, filter coefficients 230 may be computed for known narrowband interference existing within the wideband occupied by DSSS signal 200. While not explicitly shown in the Figures nor discussed in detail herein, it will be appreciated that a search and conquer technique may be used where filter coefficients 230 are generated in real time for narrowband interference detected in real time.

Those skilled in the art will appreciate that the methodology used to obtain beam and filter coefficients 228 and 230 is not a requirement of the present invention. Alternative methodologies may be used without departing from the spirit of the present invention.

A multiplier 136 combines beam coefficients 228 and filter coefficients together to produce combined coefficients 232. Those skilled in the art will appreciate that the existence of filter coefficients 230 is dependent upon the existence of an interfering signal. Filter coefficients 230 may be eliminated (i.e., made unitary). In this case, multiplier 136 does nothing and combined coefficients 232 are substantially equal to beam coefficients 228.

A memory 138 stores and releases combined coefficients 232 to produce coefficient stream 226 to provide synchronization with FD DSSS signal stream 204.

Within beam former 108, a multiplier 140 mixes FD DSSS signal stream 204 with coefficient stream 226. This results in a plurality of partial-beam signal streams 234. FD DSSS signal stream 204 contains a serial stream of segments. Multiplier 140 processes each segment serially. In this manner, a single physical multiplier 140 (FIG. 3), by acting serially, serves the function of a plurality of virtual multipliers 140' (FIG. 4), where each virtual multiplier 140' would process the data for one frequency bin for each component of beam coefficients 228.

Also in beam former 108 is an accumulative adder 142. Accumulative adder 142 sums partial-beam signal streams 234 for a given temporally identical set of segments together to produce a plurality of beamed signal streams 206. Since each segment is processed by multiplier 140 sequentially, accumulative adder 142 is made up of a summer 144 configured and an accumulator 146. Summer 144 sums each subsequent partial-beam signal stream 234 in turn, while accumulator 146 accumulates and passes back to summer 144 all partial sums. In this manner, one physical accumulative adder 142 serves the function of a plurality of virtual adders 142', where each virtual adder would sum all partial-beam signal streams 234 for each component of beam coefficients 228. Accumulative adder 142 therefore produces a beamed signal stream 206 for each component of beam coefficients 228.

With the formation of beamed signal streams 206, reception beams 201 for antenna array 102 come into existence. Each beam is formed in a direction determined by beam coefficients 228. In effect, signals arriving from that direction are normalized and signals arriving from other direction are attenuated.

DSSS signal 200 is a wideband signal. Within the bandwidth of DSSS signal 200, there may exist an interfering narrowband signal. Beam former 108 allows the generation of notches in the bandwidth of DSSS signal 200. These notches are at frequencies determined by filter coefficients 230. This results in severe attenuation of interfering narrowband signals at the notch frequencies.

Following beam former 208, beamed signal streams 206 pass to despreader 110. Despreader 110 despreads beamed signal streams 206 to produce FD despread signal stream 208. DSSS signal 200 is spread using a specific spread code. Beamed signal streams 206 must therefore be despread using a matching despread code. Despreader 110 therefore despreads beamed signal streams 206 in response to an FD despread-code stream 236 containing the requisite despread code.

The requisite despread codes are generated by a despread-code generator 148 in the time domain. Within despread code generator 148, a plurality of code oscillators 150 produce a plurality of code clocks 238 under control of a microprocessor (not shown). All code clocks 238 are substantially identical except for phase. A plurality of code generators 152, one for each code clock 238, then generate the requisite despread codes 240 in response to code clocks 238. The despread codes 240, also, are substantially identical except for phase. Despread codes 240 are the stored in a memory 154 and released as a TD despread-code stream 242 in the time domain. A TFD transformer 156 then transforms TD despread-code stream 242 from the time domain to the frequency domain to produce FD despread-code stream 236.

Despreader 110 despreads beamed signal streams 206 in response to FD despread code stream 236 (i.e., in response to the requisite despread codes 240). Within despreader 110, a multiplier 158 mixes each beamed signal string 206 with FD despread-code stream 236. This results in a plurality of FD despread signal streams 208. Each beamed signal stream 206 contains a serial stream of segments. Multiplier 158 processes each segment serially. In this manner, a single physical multiplier 158 (FIG. 3), by acting serially, serves the function of a plurality of virtual multipliers 158' (FIG. 4), where each virtual multiplier 159' would mix each beamed signal stream 206 with each despread code 240 for each component of beam coefficients 228.

Only one of the resulting FD despread signal steams 208 is viable for the signal-stream segment being processed. Beamed signal streams 206 are despread into multiple FD despread signal streams 208 in response to multiple despread codes 240 in despread-code stream 236. Since each despread code 240 has a different phase, each FD despread signal stream 208 also has a different phase. This allows for more rapid synchronization of at least one of FD despread signal streams 208 with chip-level timing signals, being the desired FD despread signal stream 208. This pseudo-parallel approach allows one despreader 110 in the frequency domain to effect the operation of multiple parallel correlators (despreaders) in the time domain, and allow rapid despreading of M-code or other codes that normally would take a significant time to correlate.

FD despread signal 206 then passes to FTD transformer 112. FTD transformer 112 transforms FD despread signal 208 from the frequency domain to the time domain and produces TD despread signal stream 210.

Figure 5:
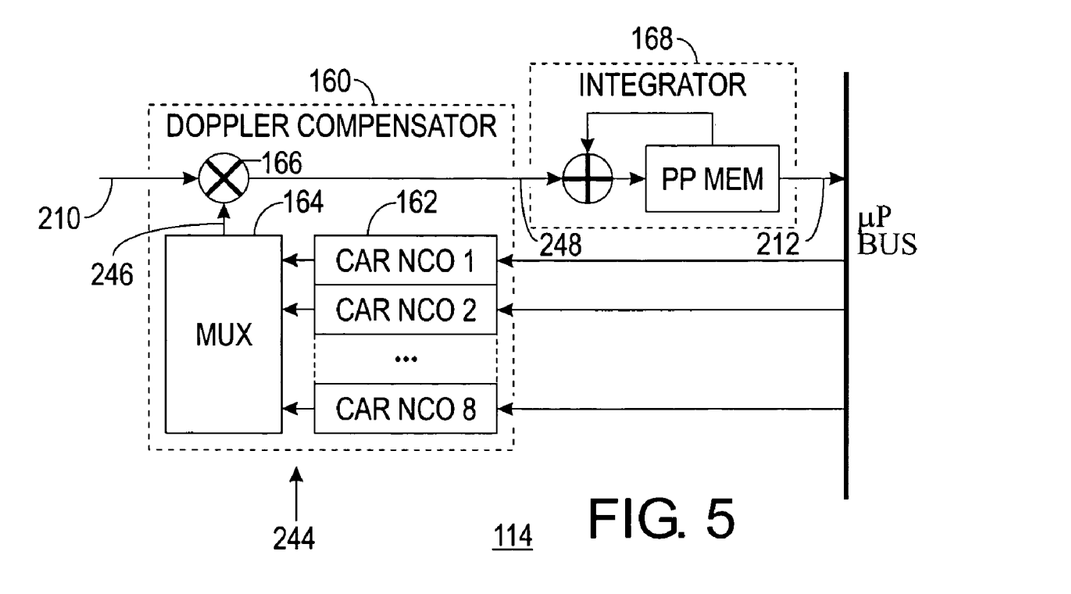
FIG. 5 shows a schematic block diagram depicting operation of a postprocessor for the system of FIG. 1 in accordance with a preferred embodiment of the present invention.

FIG. 5 shows a schematic block diagram depicting the operation of postprocessor 114 for system 100 in accordance with a preferred embodiment of the present invention. The following discussion refers to FIGS. 1 and 5.

TD despread signal stream 210 then passes into postprocessor 114. Postprocessor 114 postprocesses (i.e., processes after beam forming and despreading) TD despread signal stream 210 to produce received signal stream 212.

Within postprocessor 114, TD despread signal stream 210 passes into a Doppler compensator 160. Within Doppler compensator 160, a plurality of carrier oscillators 162 produce a plurality of Doppler clocks 244 under control of the microprocessor (not shown). All Doppler clocks 244 are substantially identical except for phase. A multiplexer 164 then multiplexes Doppler clocks 244 to produce a Doppler compensation stream 246. A multiplier 166 then mixes TD despread signal stream 210 with doppler compensation stream 246 to produce compensated signal stream 248.

Those skilled in the art will appreciate that methodology used in Doppler compensator 160 is exemplary of the preferred embodiment only. Other methodologies, including but not limited to the exclusion of Doppler compensator 160, may be used without departing from the spirit of the present invention.

Following Doppler compensator 160, compensated signal stream 160 pass into an integrator 168. Integrator 168 effects integration of compensated signal stream 248 to produce received signal stream 212. Received signal stream 212 then passes to the microprocessor (not shown).

Those skilled in the art will appreciate that integrator 168 is exemplary of the preferred embodiment and is not a requirement of the present invention. Integrator 168 is depicted in FIG. 5 as an accumulative adder. This, too, is exemplary only and is not a requirement of the present invention. It will be appreciated that other implementations of or the omission of integrator 168 does not depart from the spirit of the present invention.

In summary, the present invention teaches a system 100 and associated method for the reception and despreading of a direct-sequence spread-spectrum (DSSS) signal 200. DSSS signal 200 is preprocessed and fractured to produce a time-domain (TD) DSSS signal stream 202. TD DSSS signal stream 202 is then transformed to the frequency domain to produce a frequency-domain (FD) signal stream 204. Reception beams 201 are formed in the frequency domain to produce a beamed signal stream 206. Beamed signal stream 206 is then despread in the frequency domain to produce an FD despread signal stream 208. FD DSSS signal stream is the transformed from the frequency domain to the time domain to produce a TD despread signal stream 210. TD despread stream 210 is then postprocessed to produce a final received signal stream.

By fracturing the signal stream and effecting beam forming and despreading in the frequency domain, operation may be performed serially with simple digital circuitry that would otherwise require parallel performance with more complex high precision analog circuitry. This results in a significant decrease in circuit complexity and fragility over the prior art. System 100 utilizes a simpler, more robust circuit exhibiting a significant reduction in both chip real estate and power consumption over prior art systems. Although the preferred embodiments of the invention have been illustrated and described in detail, it will be readily apparent to those skilled in the art that various modifications may be made therein without departing from the spirit of the invention or from the scope of the appended claims.

What is claimed is:

1. A system for the reception and despreading of a direct-sequence spread-spectrum (DSSS) signal, said system comprising:
    an antenna array configured to receive said DSSS signal and comprising a plurality of antenna elements;
    a preprocessor coupled to said antenna array and configured to preprocess said DSSS signal in the time domain to produce a time-domain (TD) DSSS signal stream;
    a time-to-frequency-domain (TFD) transformer coupled to said preprocessor and configured to transform said TD DSSS signal stream from the time domain to the frequency domain to produce a frequency-domain (FD) DSSS signal stream;
    a beam former coupled to said TFD transformer, configured to form a reception beam in said DSSS signal, and configured to produce a beamed signal stream in the frequency domain from said FD DSSS signal stream;
    a despreader coupled to said beam former and configured to despread said beamed signal stream in the frequency domain to produce an FD despread signal stream; and
    a frequency-to-time-domain (FTD) transformer coupled to said despreader and configured to transform said FD despread signal stream from the frequency domain to the time domain to produce a received signal stream; and wherein:
    each of said antenna elements is configured to receive said DSSS signal as an DSSS elemental signal; and
    for one of said antenna elements, said preprocessor comprises:
        a digitizer coupled to said one antenna element and configured to down convert and digitize said DSSS elemental signal received by said one antenna element into an DSSS adjusted signal; and
        a memory coupled to said digitizer and configured to produce a portion of said TD DSSS signal stream from said DSSS adjusted signal;
    said memory is configured to partition said DSSS adjusted signal derived from said one antenna element into a plurality of DSSS signal-stream segments; and
    said preprocessor additionally comprises a multiplexer coupled to said memory and configured to route said DSSS signal-stream segments derived from said one antenna element to produce said TD DSSS signal stream.

2. A system as claimed in claim 1 wherein said DSSS signal is a code-division multiple access global positioning system signal.

3. A system as claimed in claim 1 wherein said digitizer comprises:
    an analog-to-digital (A/D) converter coupled to said one antenna element and configured to convert said DSSS elemental signal into a DSSS digitized signal; and
    a digital down converter coupled to said A/D converter and configured to down convert said DSSS digitized signal into said DSSS adjusted signal.

4. A system as claimed in claim 3 wherein:
    said digital down converter converts said DSSS digitized signal into a DSSS baseband signal; and
    said digitizer additionally comprises a presummer coupled to said digital down converter and configured to produce said DSSS adjusted signal from said DSSS baseband signal.

5. A system as claimed in claim 1 wherein:
    said digitizer additionally comprises an analog down converter coupled to said one antenna element and configured to down convert said DSSS elemental signal into a DSSS converted signal; and
    said A/D converter is coupled to said analog down converter and configured to convert said DSSS converted signal into said DSSS digitized signal.

6. A system as claimed in claim 1 wherein said memory is a multi-access memory.

7. A system as claimed in claim 6 wherein said multi-access memory comprises a plurality of ping-pong random-access memories.

8. A system as claimed in claim 1 wherein:
    said system additionally comprises a coefficient generator configured to provide a coefficient stream; and
    said beam former is coupled to said TFD transformer and said coefficient generator and is configured to produce said beamed signal stream from said FD DSSS signal stream in response to said coefficient stream.

9. A system as claimed in claim 8 wherein said coefficient generator comprises a memory configured to buffer beam coefficients for said reception beam to produce said coefficient stream.

10. A system as claimed in claim 8 wherein said beam former comprises:
a multiplier coupled to said TFD transformer and said coefficient generator, and configured to combine said FD DSSS signal stream with said coefficient stream to produce a plurality of partial-beam signal streams; and
an accumulative adder coupled to said multiplier and configured to sum said plurality of partial-beam signal streams to produce said beamed signal stream.

11. A system for the reception and despreading of a direct-sequence spread-spectrum (DSSS) signal, said system comprising:
an antenna array configured to receive said DSSS signal and comprising a plurality of antenna elements;
a preprocessor coupled to said antenna array and configured to preprocess said DSSS signal in the time domain to produce a time-domain (TD) DSSS signal stream;
a time-to-frequency-domain (TFD) transformer coupled to said preprocessor and configured to transform said TD DSSS signal stream from the time domain to the frequency domain to produce a frequency-domain (FD) DSSS signal stream;
a coefficient generator configured to provide a coefficient stream, wherein said coefficient generator comprises:
a multiplier configured to combine beam coefficients and filter coefficients for said reception beam to produce said coefficient stream; and
a memory coupled to said multiplier and configured to buffer said coefficient stream;
a beam former coupled to said TFD transformer and said coefficient generator, configured to form a reception beam in said DSSS signal, and configured to produce a beamed signal stream in the frequency domain from said FD DSSS signal stream in response to said coefficient stream;
a despreader coupled to said beam former and configured to despread said beamed signal stream in the frequency domain to produce an FD despread signal stream; and
a frequency-to-time-domain (FTD) transformer coupled to said despreader and configured to transform said FD despread signal stream from the frequency domain to the time domain to produce a received signal stream.

12. A system as claimed in claim 11 wherein:
said FDT transformer produces a TD despread signal stream; and
said system additionally comprises a postprocessor coupled to said FDT transformer and configured to postprocess said TD despread signal stream in the time domain to produce said received signal stream.

13. A system as claimed in claim 12 wherein said postprocessor comprises a doppler compensator configured to effect doppler compensation of said TD despread signal stream in the time domain to produce said received signal stream.

14. A system as claimed in claim 11 wherein said beam former comprises:
a multiplier coupled to said TFD transformer and said coefficient generator, and configured to combine said FD DSSS signal stream with said coefficient stream to produce a plurality of partial-beam signal streams; and
an accumulative adder coupled to said multiplier and configured to sum said plurality of partial-beam signal streams to produce said beamed signal stream.

15. A method of receiving a direct-sequence spread-spectrum (DSSS) signal, said method comprising:
receiving said DSSS signal at each of a plurality of antenna elements in an antenna array, wherein each of said plurality of antenna elements receives said DSSS signal as one of a plurality of DSSS elemental signals;
preprocessing each of said plurality of DSSS elemental signals in the time domain to produce a time-domain (TD) DSSS signal stream, wherein said preprocessing activity comprises:
digitizing said plurality of DSSS elemental signals to produce a plurality of DSSS digitized signals, wherein each of said DSSS digitized signals is derived from one of said DSSS elemental signals;
down converting said plurality of DSSS digitized signals to produce a plurality of DSSS baseband signals, where each of said DSSS baseband signals is derived from one of said DSSS digitized signals; and
fracturing said plurality of DSSS baseband signals into a plurality of groups of DSSS signal-stream segments, wherein each of said groups of DSSS signal-stream segments is derived from one of said DSSS baseband signals, and wherein each of said DSSS signal-stream segments is a portion of said TD DSSS signal stream;
transforming said TD DSSS signal stream from the time domain to the frequency domain to produce a frequency-domain (FD) DSSS signal stream;
forming a reception beam for said DSSS signal in the frequency domain to produce a beamed signal stream;
despreading said beamed signal stream in the frequency domain to produce an FD despread signal stream; and
transforming said FD despread signal stream from the frequency domain to the time domain to produce a TD despread signal stream.

16. A method as claimed in claim 15 wherein said preprocessing activity additionally comprises multiplexing said DSSS signal-stream segments to produce said TD DSSS signal stream.

17. A method as claimed in claim 15 wherein:
said preprocessing activity additionally comprises, prior to said digitizing activity, down converting said plurality of DSSS elemental signals to produce a plurality of DSSS converted signals, wherein each of said DSSS converted signals is derived from one of said DSSS elemental signals; and
said digitizing activity digitizes said plurality of DSSS converted signals.

18. A method as claimed in claim 15 wherein said forming activity comprises:
generating a coefficient stream comprising beam coefficients for said reception beam;
mixing said FD DSSS signal stream and said coefficient stream to form a plurality of partial-beam signal streams; and
accumulatively summing each of said plurality of partial-beam signal streams to produce a plurality of beamed signal streams.

19. A method as claimed in claim 15 wherein said generating activity comprises mixing said beam coefficients with filter coefficients for said reception beam to form said coefficient stream.

20. A method as claimed in claim 15 additionally comprising postprocessing said TD despread signal stream to produce a received signal stream.

21. A method as claimed in claim 20 wherein said postprocessing activity comprises compensating said TD despread signal stream for doppler effects.

22. A system for the reception and despreading of a direct-sequence spread-spectrum (DSSS) signal, said system comprising:
an antenna array configured to receive said DSSS signal and comprising a plurality of antenna elements;
a preprocessor coupled to said antenna array and configured to preprocess said DSSS signal in the time domain to produce a time-domain (TD) DSSS signal stream;
a first time-to-frequency-domain (TFD) transformer coupled to said preprocessor and configured to transform said TD DSSS signal stream from the time domain to the frequency domain to produce a frequency-domain (FD) DSSS signal stream;
a despread-code generator configured to provide a TD despread code for said DSSS signal in the time domain;
a second TFD transformer coupled to said despread-code generator and configured to transform said TD despread code from the time domain to the frequency domain to produce an FD despread code;
a beam former coupled to said TFD transformer, configured to form a reception beam in said DSSS signal, and configured to produce a beamed signal stream in the frequency domain from said FD DSSS signal stream;
a despreader coupled to said beam former and said second TFD transformer and configured to despread said beamed signal stream in the frequency domain into an FD despread signal stream in response to said FD despread code;
a despreader coupled to said beam former and configured to despread said beamed signal stream to produce an FD despread signal stream; and
a frequency-to-time-domain (FTD) transformer coupled to said despreader and configured to transform said FD despread signal stream from the frequency domain to the time domain to produce a received signal stream.

23. A system as claimed in claim 22 wherein said despread-code generator comprises:
a code oscillator configured to produce a code clock; and
a code generator coupled to said code oscillator and configured to generate said TD despread code in response to said code clock.

24. A system as claimed in claim 22 wherein:
said despread-code generator is configured to provide a plurality of said TD despread codes in the time domain;
said second TFD transformer is configured to transform said plurality of TD despread codes from the time domain to the frequency domain to produce a plurality of said FD despread codes;
said despreader is configured to despread said beamed signal stream into said FD despread signal stream in response to said plurality of FD despread codes; and
said despread-code generator comprises:
a plurality of code oscillators and configured to produce a plurality of code clocks; and
a plurality of code generators configured to generate a said plurality of TD despread codes, wherein each of said code generators is coupled to one of said code oscillators and is configured to produce one of said TD despread codes in response to one of said code clocks.

25. A system as claimed in claim 22 wherein said despreader comprises a multiplier configured to despread said beamed signal stream in response to said FD despread code to produce said FD despread signal stream.

26. A method of receiving a direct-sequence spread-spectrum (DSSS) signal, said method comprising:
receiving said DSSS signal at each of a plurality of antenna elements in an antenna array, wherein each of said plurality of antenna elements receives said DSSS signal as one of a plurality of DSSS elemental signals;
preprocessing each of said plurality of DSSS elemental signals in the time domain to produce a time-domain (TD) DSSS signal stream;
transforming said TD DSSS signal stream from the time domain to the frequency domain to produce a frequency-domain (FD) DSSS signal stream;
forming a reception beam for said DSSS signal in the frequency domain to produce a beamed signal stream;
despreading said beamed signal stream in the frequency domain to produce an FD despread signal stream;
generating a TD despread code for said DSSS signal in the time domain;
transforming said TD despread code from the time domain to the frequency domain to produce an FD despread code;
multiplying said beamed signal streams by said FD despread code in the frequency domain to produce said FD despread signal stream; and
transforming said FD despread signal stream from the frequency domain to the time domain to produce a TD despread signal stream.

27. A method of receiving a direct-sequence spread-spectrum (DSSS) signal, said method comprising:
receiving said DSSS signal at each of a plurality of antenna elements in an antenna array, wherein each of said plurality of antenna elements receives said DSSS signal as one of a plurality of DSSS elemental signals;
preprocessing each of said plurality of DSSS elemental signals in the time domain to produce a time-domain (TD) DSSS signal stream;
transforming said TD DSSS signal stream from the time domain to the frequency domain to produce a frequency-domain (FD) DSSS signal stream;
forming a reception beam for said DSSS signal in the frequency domain to produce a beamed signal stream;
despreading said beamed signal stream in the frequency domain to produce an FD despread signal stream;
generating a plurality of TD despread codes for said DSSS signal in the time domain;
transforming said TD despread codes from the time domain to the frequency domain to produce a plurality of FD despread codes;
multiplying said beamed signal streams by said FD despread codes in the frequency domain to produce said FD despread signal stream; and
transforming said FD despread signal stream from the frequency domain to the time domain to produce a TD despread signal stream.

28. A system for the reception and despreading of a direct-sequence spread-spectrum (DSSS) signal, said system comprising:
an antenna array configured to receive said DSSS signal and comprising a plurality of antenna elements, wherein each of said antenna elements is configured to receive said DSSS signal as a DSSS elemental signal;
a plurality of analog-to-digital (A/D) converters, wherein each of said A/D converters is coupled to one of said antenna elements and is configured to digitize said DSSS elemental signal received thereby to produce a DSSS digitized signal;
a plurality of multi-access memories, wherein each of said multi-access memories is coupled to one of said digital down converters and is configured to partition said DSSS digitized signal down converted thereby to produce a TD DSSS signal stream;

a first time-to-frequency-domain (TFD) transformer coupled to said preprocessor and configured to transform said TD DSSS signal stream from the time domain to the frequency domain to produce a frequency-domain (FD) DSSS signal stream;

a coefficient generator configured to merge beam coefficients and filter coefficients for a reception beam in said DSSS signal to produce a coefficient stream;

a beam former coupled to said TFD transformer and said coefficient generator, configured to said reception beam, and configured to produce a beamed signal stream in the frequency domain from said FD DSSS signal stream in response to said coefficient stream;

a despread-code generator configured to provide a plurality of TD despread codes for said DSSS signal in the time domain;

a second TFD transformer coupled to said despread-code generator and configured to transform said plurality of TD despread codes from the time domain to the frequency domain to produce a plurality of FD despread codes;

a despreader coupled to said beam former and said second TFD transformer, and configured to despread said beamed signal stream in the frequency domain in response to said plurality of FD despread codes to produce an FD despread signal stream; and a frequency-to-time-domain (FTD) transformer coupled to said despreader and configured to transform said FD despread signal stream from the frequency domain to the time domain to produce a received signal stream.

* * * * *

UNITED STATES PATENT AND TRADEMARK OFFICE
CERTIFICATE OF CORRECTION

PATENT NO. : 7,324,582 B2
APPLICATION NO. : 10/754001
DATED : January 29, 2008
INVENTOR(S) : Carson Page 1 of 1

It is certified that error appears in the above-identified patent and that said Letters Patent is hereby corrected as shown below:

In the Specifications

Column 1, line 5-7 add the following paragraph between the Title and Technical Field:

--STATEMENT REGARDING FEDERALLY SPONSORED RESEARCH OR DEVELOPMENT

This invention was made with government support under Agreement No. F29601-03-2-0060 awarded by the United States Air Force, Air Force Research Laboratory at Kirkland AFB. The government has certain rights in this invention.--

Signed and Sealed this
Twenty-fifth Day of March, 2014

Michelle K. Lee
*Deputy Director of the United States Patent and Trademark Office*